United States Patent

[11] 3,554,301

[72] Inventors David E. Adkins;
    Jeremy M. Harris, Columbus; George R. Riley, Grove City; Donald J. Hackman, Columbus, Ohio
[21] Appl. No. 853,123
[22] Filed Aug. 26, 1969
[45] Patented Jan. 12, 1971
[73] Assignee American Gas Association, Inc.
    New York, N.Y.
    a corporation of New York

[54] OPTICAL AUGER GUIDANCE SYSTEM
    10 Claims, 5 Drawing Figs.
[52] U.S. Cl. .................................................. 175/24, 299/1
[51] Int. Cl. .................................................. E21c 9/00, E21c 19/00
[50] Field of Search .......................................... 175/24, 26, 45, 73; 299/1; 33/205

[56] References Cited
UNITED STATES PATENTS

| | | | |
|---|---|---|---|
| 2,656,505 | 10/1953 | Hewitt............................ | 175/45X |
| 3,243,001 | 3/1966 | Vincent.......................... | 175/73 |
| 3,482,103 | 12/1969 | Martinsen..................... | 299/1X |
| 3,484,136 | 12/1969 | Colson .......................... | 299/1 |
| 3,498,673 | 3/1970 | Ledray et al.................. | 299/1 |

FOREIGN PATENTS

| | | | |
|---|---|---|---|
| 215,563 | 5/1924 | Great Britain................ | 175/45 |

Primary Examiner—David H. Brown
Attorney—Fishman and Van Kirk

ABSTRACT: Signals indicative of the bending of an elongated rotating member are generated by a light sensitive detector mounted within the member and off-axis with respect to a circular light beam generator. The detector output signals are employed to control apparatus which reacts externally of the member in such a manner as to return the member to the desired straight line path.

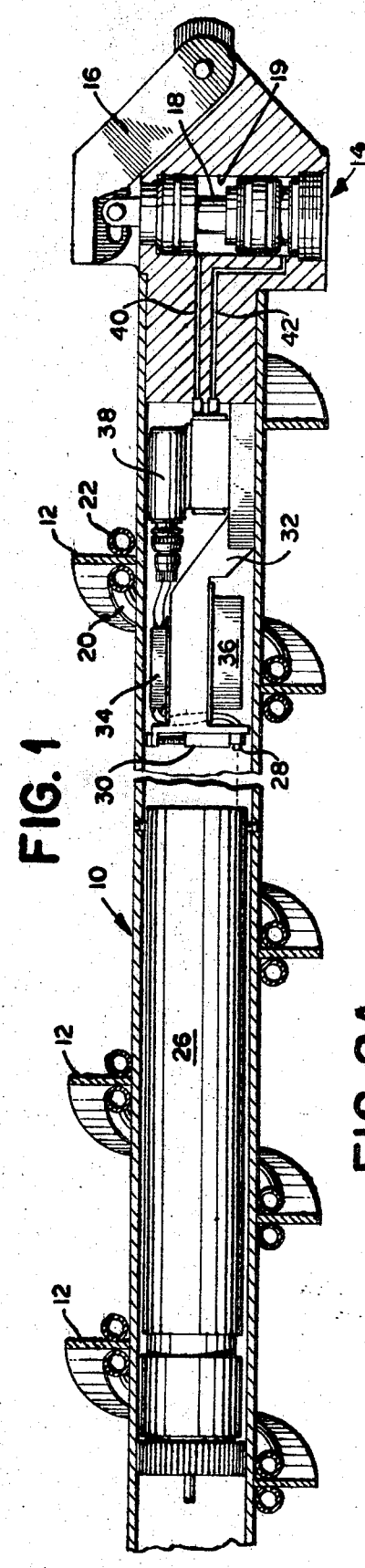
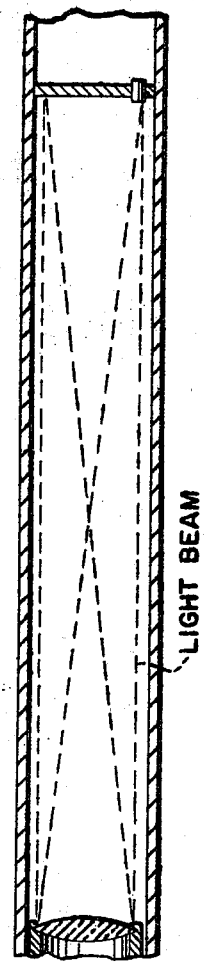
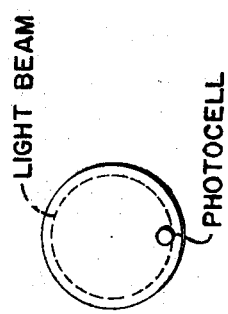
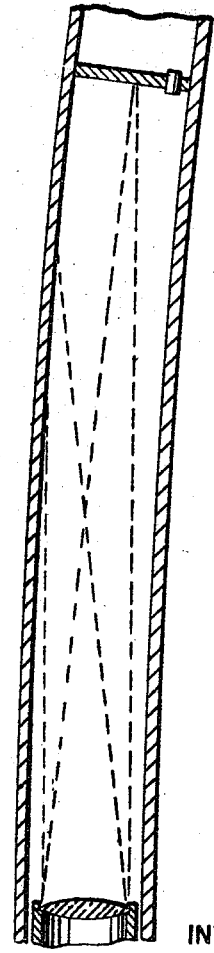
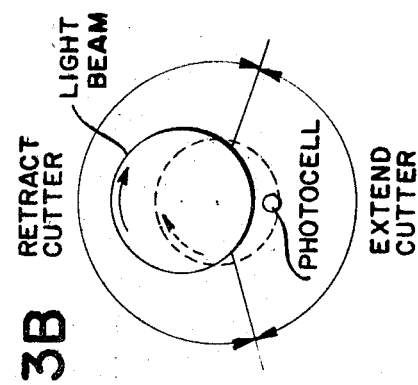
INVENTORS
JEREMY M. HARRIS
DAVID E. ADKINS
GEORGE R. RILEY
DONALD J. HACKMAN
BY
FISHMAN & VAN KIRK
ATTORNEYS

OPTICAL AUGER GUIDANCE SYSTEM

BACKGROUND OF THE INVENTION

1. Field of the Invention

The present invention relates to the sensing of deflection of a rotating member. More particularly, the present invention relates to a guidance system for horizontal earth boring equipment which generates control signals in response to undesired auger deflections. Accordingly, the general objects of the present invention are to provide novel and improved methods and apparatus of such character.

2. Description of the Prior Art

Utility companies have long recognized the costly labor expense and public opposition associated with the prior art method installing distribution lines in excavated trenches. These problems have, of course, been aggravated when the breaking of pavement or the interruption of railway service was involved. The disadvantages inherent in trenching can be significantly reduced by using horizontal earth boring tools for installing underground pipe, cables, and conduits and accordingly horizontal augering has in recent years been specified in many situations requiring the placement of utility lines under roads and railroads.

Prior art horizontal augering equipment has, however, been plagued with a serious problem. This problem resides in the previously existing inability to monitor and exercise control over the direction of the drill string so that the drill may be redirected should it deviate from the correct drilling path. As is known, unpredictable drift in underground boring operations is caused by the flexibility of the boring tool. It is extremely difficult to make such tools stiff or rigid enough to withstand lateral thrust loads imposed on the drill head or bit by stone, other soil discontinuities, or even by the rotational torque transmitted to the drill string from the driving apparatus.

In the prior art, the only directional control available has been the use of pickup or pot holes located at intervals along the desired tunnel path; auger drift or deflection hopefully being detected and the bit being realigned if necessary as it passes each of the pickup holes. Many times drill string deflection between pickup holes too slight to be visually noticed at the pick up holes will make it difficult to later insert a casing or carrier pipe. Also, the use of pickup holes is subject to the same public opposition, albeit to a lesser degree, as trenching.

It has been recognized that a more accurate method of underground installation of a conduit encompasses augering through a casing while simultaneously jacking the casing. However this method will also fail when the drill string is deflected since the auger will bind in the casing. Such binding sometimes results in a loss of a section of auger as well as loss of time spent in partially completing the tunnel.

Recently, techniques have been devised for exercising directional controls over horizontal boring tools where the ability to redirect in multiple directions is necessary. An example of such directional control apparatus is disclosed in U.S. Pat. application Ser. No. 742,798, filed July 5, 1968 by David E. Adkins and Donald J. Hackman and assigned to the assignee of the present invention. Utilization of directional control apparatus such as that described in the aforementioned Adkins et al. application is, of course, dependent upon the provision of suitable guidance equipment wherein auger pipe deflection can be sensed and properly phased control signals delivered to the equipment which actually causes the drilling equipment to return to its proper course.

SUMMARY OF THE INVENTION

The present invention comprises an optical auger guidance system suitable for installation within an auger pipe. The system includes a light source and light sensitive detection device. The detection device is mounted off-axis with respect to the auger and preferably adjacent the auger head while the light source is mounted a substantial distance rearwardly of the auger head and on the auger pipe axis. Through the use of suitable optics, the light source provides a substantially circular beam of light. Due to its off-axis mounting, the detection device will rotate with the auger and the circle transcribed thereby, with the auger pipe in an undeflected condition, will fall within the circular light beam provided by the light source. Accordingly, when the auger pipe is straight, the detection device and light beam remain concentric as the auger rotates and the detection device will be continuously illuminated. However, should the auger pipe be bent elastically into a curve, as might occur when the auger head is deflected laterally through contact with a rock, the detection device will travel outside of the light beam in an arc which is proportional to the amount of auger pipe deflection. The "arc of darkness" or period when the detection device is not illuminated will be symmetrical about the plane in which the deflection or bending of the auger pipe occurs. Accordingly, through the use of suitable electronics, a device such as the control apparatus disclosed in previously mentioned copending application Ser. No. 742,798 may be actuated during the "arc of darkness" so as to automatically cause corrective action which will result in the auger returning to the desired straight line path.

BRIEF DESCRIPTION OF THE DRAWINg

The present invention may be better understood and its numerous objects and advantages will become apparent to those skilled in the art by reference to the accompanying drawing wherein like reference numerals refer to like elements in the various figures and wherein:

FIG. 1 is a side elevation view, partly in section, of a preferred embodiment of the present invention with the components of the invention shown in block form.

FIGS. 2A and 2B are respectively side elevation and end view which schematically illustrate operation of the present invention with the auger pipe in the undeflected position.

FIGS. 3A and 3B are respectively side elevation and end views which schematically depict operation of the present invention when the auger pipe is deflected.

DESCRIPTION OF THE PREFERREd EMBODIMENT

With reference not to FIG. 1, the first selection of an extendable auger pipe is indicated generally at 10. As the bore hole is lengthened, pipe 10 will be extended by the addition of sections thereto in the manner well known in the art. As will be described in detail below, the control system of the present invention is mounted within the auger pipe. The auger flight 12 is attached to the exterior of pipe 10 and, in the manner known in the art, extends rearwardly from an auger head, indicated generally at 14, to the opposite end of the auger in a screwlike manner with a predetermined pitch. The auger pipe and head assembly will be caused to rotate as the bore hole is lengthened by drive means, not shown, of a type known in the art. Torque may be transmitted to the auger, by way of example, via a drive coupling by means of sprocket and chain drive. In addition to rotating the auger, conventional means are employed to urge the auger forward as it rotates.

The auger head 14 will serve as the housing for suitable means, operating under the control of the present invention, for correcting undesired drift of the auger. Such correctional means may, for example, comprise the selective cutter system disclosed in aforementioned copending application Ser. No. 742,798.

FIG. 1 shows a slightly modified selective cutter system, which operates in the same manner as that disclosed in aforementioned copending application Ser. No. 742,798. The selective cutter shown in FIG. 1 comprises an extendable cutter blade 16 which is operated under the control of fluid applied to opposite sides of a piston 18 positioned within a cylinder 19 in auger head 14. Operating fluid under pressure is supplied to and bled from the cylinder 19 at opposite sides of the piston 18; the supply of fluid to cylinder 19 being controlled by the present invention in the manner to be described below. The operating fluid is delivered to and returned to a reservoir from the forward end of the auger via conduits 20 and 22 which are wrapped around the auger pipe as shown. Alternatively, the conduits 20 and 22 may be disposed with the auger pipe. It is, of course, necessary to provide suitable connectors for conduits 20 and 22 at each end of each length of auger pipe 10.

The auger head 14 may also support a forwardly extending pilot bit, not shown, and may have cutter teeth, not shown, in its front face. The pilot bit and teeth are, however, not necessary in all applications.

The control system of the present invention includes a circular light beam generator 26 which is mounted within auger pipe 10 a substantial distance, for example 12 feet, rearwardly of auger head 14. The light beam generator 26 may comprise an incandescent lamp and suitable optics for providing a light light beam which is substantially circular. Thus, for example, circular light beam generator 26 may comprise a model L-214A light source available from Autotron, Inc., 3629 North Vermilion Street, Danville, Ill., 61832, which employs a 32 candlepower incandescent lamp. Light emanating from this lamp shines through a three thirty-second inch diameter hole in a mask and is thereafter focused through a suitable lens so that, at 10 feet, the light beam is approximately 2 inches in diameter.

The light from beam generator 26 will impinge upon a detector unit positioned just rearwardly of auger head 14 and also within auger pipe 10. The detector unit comprises a photocell or similar light sensitive device 28 mounted on a radially adjustable base mechanism 30. The light sensitive element 28 may, for example, comprise a silicon photodiode such as National Semiconductors, Ltd. type No. NSL-710P. The light sensitive element 28 and the adjustable base 30 are mounted from a support bracket 32; bracket 32 being fixed to a servovalve extension of auger head 14 coupled to auger pipe 10. The light sensitive element 28 and its base 30 will, accordingly, rotate with the auger pipe. As may be seen from FIG. 1, base 30 is initially adjusted so as to place light sensitive element 28 adjacent the periphery of the circular light beam provided by beam generator 26. Accordingly, the light sensitive element 28 will transcribe a circle as the auger rotates and this circle, with the auger pipe in the desired undeflected position, will fall within the area defined by the light beam from generator 26. This condition is shown schematically in FIGS. 2A and 2B.

Light sensitive element 28 will provide an electrical signal indicative of its instantaneous state of illumination. This electrical signal will be applied as an input to an amplifier 34. Amplifier 34 will comprise a suitable solid state, direct current operational amplifier which, with element 28 illuminated, will provide a high level output signal. Amplifier 34 will be bistable in nature whereby a lack of or substantial decrease in the illumination of photo sensitive element 28 will result in reversal of the output polarity of the signal provided by amplifier 34. Power for amplifier 34 and for biasing of light sensitive element 28 will provided by a DC power supply 36 which, like amplifier 34, is also mounted from and rotates with support 32. Amplifier 34, for example, may comprise a Nexus Model SK-6 available from Nexus Research Laboratories, Inc., 480 Neponset Street, Canton, Mass. Amplifier 34 acts as a switch to dump ± 10 volts DC from power supply 36 across the coils of a servovalve 38. The power supply 36 may comprise a Nexus Model NPS-30.

As noted above, amplifier 34 controls servovalve 38. Valve 38 may, for example, comprise a model No. 32S020 servovalve available from Moog, Inc. of East Aurora, N.Y. Conduits 20 and 22 are brought into auger pipe 10, via a pair of hydraulic entrance penetrators which are not shown but which are located at opposite sides of the auger pipe, and are connected to valve 38. Valve 38 is also provided with connections to a pair of fluid passages 40 and 42 drilled in auger head 14 and communicating with opposite ends of cylinder 19. The position of piston 18 and thus the extension and retraction of cutter blade 16 will accordingly be controlled by servovalve 38. In the manner described in aforementioned copending application Ser. No. 742,798, blade 16 may be rapidly extended and retracted as the auger rotates by means of selectively pressurizing the opposite sides of piston 18.

When light sensitive element 28 is illuminated, the output of amplifier 34 will be of proper polarity to cause servovalve 38 to assume the position whereby piston 18 will be in the position shown in FIG. 1 and cutter blade 16 retracted. However, if the auger pipe is bent elastically into a curve, as shown schematically in FIG. 3A, element 28 will travel outside of the light beam in an arc which has a length proportional to the amount of deflection. As may be seen from FIG. 3B, the arc through which the element 28 will not be illuminated in symmetrical about the plane in which the deflection or bending of auger pipe 10 occurs. With the element 28 not illuminated, the output of amplifier 34 will change state, switching in the power source, and servovalve 38 will be operated so as to reverse the pressurization of cylinder 19. Accordingly, piston 18 will be operated to the opposite (outer) end of the cylinder and cutter blade 16 will be extended. Extension of cutter blade 16 will, of course, cause the reaming of the slide of the bore hole in such a manner as to permit the auger pipe to move back to the proper straight line path. As may be seen from FIG. 3B, the cutter blade 16 will be extended and retracted once for each rotation of the auger pipe as the forward progress of the bore continues without interruption until the condition of FIGS. 2A and 2B is again achieved.

To summarize the structure and operation of the above-described embodiment of the present invention, a photocell light-source combination comprises a feedback mechanism for sensing various degrees of auger pipe deflection. The photocell 28 is positioned on a radius about the longitudinal axis of the auger pipe 10 and describes a circle as the auger is rotated. The light beam shines down the pipe and floods the path of the photocell when the auger is proceeding in a straight path. When the auger is deflected or drifts from the desired straight path, the photocell circle and the beam spot are no longer concentric and the photocell travels outside the beam along an arc which increases in length with increasing pipe deflection. The photocell is clamped in a sliding bracket 30 to permit radial adjustment. With the photocell near the walls of the auger pipe, and hence near the edge of the light beam, the guidance device is sensitive to very slight deflections. With the photocell adjusted to be nearer the longitudinal axis of the pipe, and well inside the light beam, the auger must be deflected to a considerable degree in order to darken the photocell.

Light from the source 26 is collimated and focused sharply to obtain a distinct boundary between light and dark as seen by the photocell. The output voltage from the photocell controls a switching device which, in turn, applies voltage across the coils of a servovalve 38 in the proper polarity so as to energize or deenergize a redirection device which selectively reams the side of the bore hole. In typical embodiment described, the low level output of photocell 28 provides energy for switching a solid state operational amplifier 34 which in turn applies a positive voltage across the servovalve coils when the photocell is lighted and a negative voltage across the coils when the photocell is dark; the valve operating power being supplied from a solid-state DC power supply 36.

The redirection device controlled by the guidance system of the present invention has its design based on theoretical soil-failure technology. The device includes a hydraulic cylinder 19 within the auger head and a cutter blade 16, the cutter blade being extended and retracted by means of pressurizing a piston 18 within the auger head cylinder. Accordingly, when the auger is deflected, the photocell passes out of the light beam for some arc. When the cell becomes dark, the amplifier 34 reverses the polarity across the coils of the electrohydraulic servovalve 38. This action slows the main spool within the servovalve to reverse the direction of hydraulic flow; this operation being accomplished in about 5 milliseconds in one apparatus. Flow reversal causes the servovalve to dump high-pressure oil to the bottom of piston 18 at a rate of, for example, 12 gallons per minute while the oil on top of the piston is returned to the reservoir. When the photocell passes back into the light, the servovalve again switches to drive the piston and cutter blade back into the auger head. The length of the dark arc in the photocell path will, of course, determine the distance the head is deflected. The cutter blade in one embodiment extends in 0.04 seconds with a maximum force of 7,000 lbs. and selectively reams a swarth of soil from the side of the bore hole thereby causing the desired correctional deflection of the auger pipe.

While a preferred embodiment has been shown and described, various modifications and substitutions may be made thereto without departing from the spirit and scope of the present invention. Accordingly, while the described embodiment has employed a selective cutter device under control of the present invention, it is to be understood that any suitable redirection device could be substituted therefor. Accordingly, the present invention has been described by way of illustration and not limitation.

We claim:

1. An optical guidance system for a boring tool, said tool being of the rotary type and including normally inoperative means for producing radial directional corrective action, said guidance system comprising:
   means positioned within the tool for generating a beam of radiant energy;
   detector means responsive to the energy emanating from said beam generating means, said detector means being positioned within the tool and spacially displaced from said beam generating means, the relative positions of said generating and detector means being selected whereby undesired bending of said tool will result in periodic variation in the impingement of energy on said detector means; and
   means connected to said detector means and responsive to the state of energy impingement thereon for generating energizing signals for said directional correcting means.

2. The apparatus of claim 1 wherein said beam generating means comprises means for producing a circular beam of light.

3. The apparatus of claim 2 wherein said detector means comprises a light sensitive element positioned off-axis with respect to said beam of light, said element rotating with said tool.

4. The apparatus of claim 3 wherein said means for generating energizing signals comprises means responsive to the state of illumination of said light sensitive element.

5. The apparatus of claim 3 wherein said directional correcting means is hydraulically operated and wherein said means for generating energizing signals comprises;
   valve means for controlling the flow of operating fluid to said correcting means; and
   means responsive to the state of illumination of said light sensitive element for generating valve means control signals whereby said correcting means is periodically rendered operative when said tool undergoes undesired bending.

6. The apparatus of claim 3 wherein the beam of light emanating from said producing means is coaxial with the tool.

7. The apparatus of claim 6 wherein said detector means further comprises adjustable support means for said light sensitive element, said support means being mounted internally of the tool and enabling said element to be selectively positioned radially of the tool.

8. The apparatus of claim 7 wherein said directional correcting means is hydraulically operated and wherein said means for generating energizing signals comprises:
   valve means for controlling the flow of operating fluid to said correcting means; and
   means responsive to the state of illumination of said light sensitive element for generating valve means control signals whereby said correcting means is periodically rendered operative when said tool undergoes undesired bending.

9. The apparatus of claim 8 wherein said means for generating valve means control signals comprises:
   switch means responsive to output signals provided by said light sensitive element; and
   power supply means, said power supply means being selectively connected to said valve means by said switch means.

10. The apparatus of claim 9 wherein said switch means comprises bistable circuit means.